United States Patent Office 3,453,467
Patented July 1, 1969

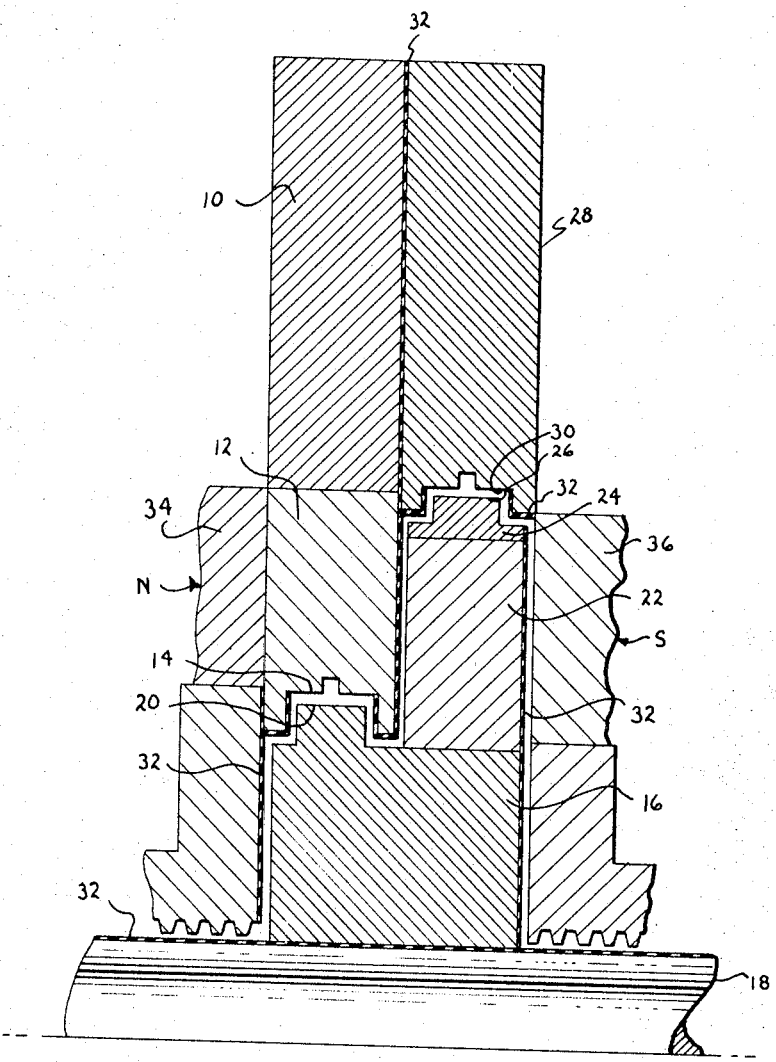

1

3,453,467
HIGH SPEED HOMOPOLAR MACHINE
Luke M. Harvey, Schenectady, N.Y., assignor to General Electric Company, a corporation of New York
Filed Aug. 29, 1966, Ser. No. 575,863
Int. Cl. H02k 31/04
U.S. Cl. 310—178                            9 Claims

ABSTRACT OF THE DISCLOSURE

A high speed homopolar machine utilizing in its stepped cyclindrical drum a combination of highly conductive, non-magnetic material with a ferromagnetic material in such a manner as to obtain good heat transfer across its liquid metal current collectors.

---

The present invention relates to homopolar electric machines and, more specifically, pertains to high speed, compact machines of this kind having conductive liquid metal current collectors.

The homopolar machine is an advantageous low voltage, high current dynamoelectric device. It offers the promise of high power per unit volume at high efficiency. It is also a relatively simple and reliable machine which is adapted for high speed operation, for example 7000 r.p.m. and above.

Heretofore, homopolar machines have suffered disadvantages through attempts to make the machines more compact, particularly machines utilizing otherwise highly desirable liquid metal current collectors. In machines having a rotor fabricated from steel, great quantities of heat are generated in the steel because of resistance heating and the steel-liquid metal interface in the collector is not an adequate heat transfer agent. Also, a relatively long current conduction path of steel is inefficient. In addition, the steel rotor provides an undesirable magnetic path in the vicinity of the collector that deleteriously affects its operation. On the other hand, a rotor fabricated from one of the desirably highly conductive materials, as copper, solves the foregoing problems but at the expense of requiring an exceedingly large magnetizing force to create a useful field through this essentially non-magnetic material. Also, the hoop strength of the rotor is reduced by fabrication from highly conductive materials to the point where only relatively modest rotational velocities can be tolerated.

Accordingly, a primary object of this invention is to provide an efficient, compact, high speed homopolar machine.

Another object of this invention is to provide a high speed rotor for a homopolar machine with improved heat transfer across one or more liquid metal current collectors.

Briefly, in accord with a preferred embodiment of my invention, I provide a homopolar machine having a composite rotor fabricated preferably from copper and low carbon steel. The rotor comprises a shaft-mounted copper drum having the rotary portion of a first current collector on one half thereof. An annular steel plate surrounds and is fixed to the copper drum for providing an axial magnetic flux path, and a copper ring is fixed to the outer peripheral surface of the steel disc and provides the rotary portion of a second current collector. In this

2 way a rotor is provided having the desirable magnetic and structural properties of steel while retaining the desirable aspects of copper in the current collectors and in a major portion of the rotor current path.

While the specification concludes with claims particularly pointing out and distinctly claiming the subject matter which I regard as my invention, it is believed the invention will be better understood from the following description taken in connection with the accompanying drawing in which:

The single figure is a partial cross-section view of a homopolar machine in accord with the invention.

Each of the components illustrated in the drawing is of cyclindrical or annular configuration. Proceeding in the order of one possible direction of current through the machine, there is provided a first stator terminal 10 of highly conductive material, as copper. Terminal 10 surrounds and is fixed to an annular plate 12, of ferromagnetic material, as low carbon steel. The inner peripheral surface 14 of plate 12 is equipped with the stationary half of a first liquid metal current collector. A drum 16 of highly conductive material is suitably mounted for rotation, as by fixing to a rotatably mounted shaft 18, and one axial half of drum 16 is equipped with a suitable surface 20 providing the rotary half of the first liquid metal collector. An annular plate 22, of ferromagnetic material, surrounds and is fixed to the other axial half of drum 16 for rotation therewith. A ring 24 of highly conductive material is fixed to the outer peripheral surface of plate 22 and is equipped with a suitable surface 26 which provides the rotary half of a second liquid metal collector. A second terminal 28 surrounds and is radially spaced from ring 24. Terminal 28 includes an inner peripheral surface 30 which provides the stationary half of the second liquid metal collector.

The presently preferred approach for obtaining the indicated joints between the bodies of highly conductive material and the bodies of ferromagnetic material, particularly in the case where copper and low carbon steel are respectively used, is to utilize deep electron beam welding. Joints of exceptional mechanical strength and consistently high electrical conductivity are thereby provided. Threaded joints, press and shrink fits, bolted construction, brazing and the like other well-known expedients can also be used when greater bulk is not objectionable, and depending upon the particular materials selected.

The electrical insulating material indicated by the heavy surface lines at 32 throughout the drawing is conveniently selected to be an aluminum oxide coating of approximately 0.018 inch in thickness, although other suitable alternatives are, of course, available. Aluminum oxide has been found to be particularly durable and effective, especially in the case where sodium-potassium is used as the conductive liquid metal in the respective current collector gaps. The aluminum oxide is advantageously applied by oxy-acetylene spraying and the coating is thereafter ground with a diamond wheel. The axial end surface of the rotor that includes annular plate 22 is electrically insulated and the remainder of the clearance gap between the rotor and stator, exclusive of the current collecting regions, is electrically insulated by providing insulation on the corresponding stator components. It is desirable to electrically insulate drum 16 from shaft 18, as shown, to prevent possible circulating currents in the shaft. The insulation permits operation with a completely flooded gap, or clearance, between the rotor and stator, should this condition occur inadvertently or be the normal mode of operation. It has been found highly desirable to insulate the rotor itself along its axial end surface of greatest radial dimension because the electromagnetic relationships are such that any conducting liquid in the corresponding radially extending gap does not revolve appreciably and thereby provides a short circuit otherwise. No similar circumstance has been found to exist in the approximately central gap along the other side of plate 22, because the conductive liquid does revolve with the rotor when present there.

The liquid metal current collectors need not be of any particular kind insofar as the present invention is concerned. A current collector of the kind described in my copending patent application (Ser. No. 583,276, filed concurrently herewith), assigned to the assignee herein, has been found to be highly advantageous in combination with the present invention.

The general principles of operation of the homopolar machine described are well known and can be found in the explanation of the Faraday disc in many textbooks relating to direct-current machines. The machine described performs with equal facility as a motor or a generator. The active portion of the rotor, or portion in which electric energy is converted or generated, is annular plate 22. The electromagnetic flux, or magnetic field established between pole pieces 34 and 36, and extends axially through ferromagnetic plates 12 and 22 and across the clearance gaps adjacent both axial ends of plate 22. The only useful field is that which passes between the two current collectors. The designations, N and S, on pieces 34 and 36 in the drawing serve only to readily identify them as corporating magnetic poles, and the polarity could as well be reversed. Plates 12 and 22 are most conveniently provided with substantially rectangular cross sections, as with the other basic components described, in which event their axial dimensions and radial dimensions are, respectively, substantially equal.

The ratio of the inner diameter of the plate 22 (outer diameter of drum 16) to the outer diameter of the plate 22 has been found to fall within the range of from 0.5 to 0.7 for optimum performance. At the low end of the range, the voltage is increased, but below the ratio of 0.5 the sustained current-carrying capacity drops to the point where efficiency becomes markedly reduced. Higher ratios provide higher current capability and the sustained current capacity increases in this direction more rapidly than the voltage drops. Accordingly, the power rating of the machine is greater for higher ratios. Beyond the ratio of 0.7 however, the voltage reduction occasions a marked drop in efficiency.

By the term highly conductive material, as used herein and in the appended claims, it is intended that a non-magnetic material having a conductivity in the order of copper is to be used. The presently preferred material is chromium alloy copper having from ½% to 1% chromium. The presently preferred ferromagnetic material is vacuum degassed carbon steel, AISI Standard 1020 (having 0.2% carbon).

By way of specific example, a machine constructed as described and to the scale of the drawings in which the thickness of plate 22 is ⅞ inch, provides as a generator a 6-volt output at 60,000 amperes on a continuous basis when the rotational velocity is 12,000 r.p.m. There is thus provided a 360 kilowatt machine in accord with this invention in an extremely compact assembly. By increasing the width of plate 22 to 1½ inches, the current capacity increases to 150,000 amperes. The present limiting factor is the thickness of plate 22 that can be suitably secured on drum 16 as an integral part therewith.

The foregoing is a description of an illustrative embodiment of the invention, and it is applicant's intention in the appended claims to cover all forms which fall within the scope of the invention.

What I claim as new and desire to secure by Letters Patent of the United States is:

1. A homopolar machine comprising:
   (a) a rotor including a rotatable cylindrical drum of highly conductive and nonmagnetic material, a rotary liquid metal current collector surface on the peripheral surface of said drum at one axial end thereof, a radially extending rotary annular plate of ferromagnetic material having the inner peripheral surface thereof contiguous with and fixed to the outer peripheral surface of said drum at the other end thereof, a ring of highly conductive and nonmagnetic material having the inner peripheral surface thereof contiguous with and fixed to the outer peripheral surface of said rotary annular plate, said highly conductive and nonmagnetic material of said rotatable cylindrical drum and said ring of different material from said ferromagnetic material of said rotary annular plate, and a rotary liquid metal current collector surface on the outer peripheral surface of said ring; and
   (b) a stator including first and second annular terminals of highly conductive material in axial alignment with each other and radially aligned respectively with said ring and with said one axial end of said drum, a stationary liquid metal current collector surface on the inner periphery of said first terminal cooperating with the rotary liquid metal current collector surface of said ring, a stationary annular plate of ferromagnetic material extending radially inwardly from second terminal and having the outer peripheral surface of said second terminal, a stationary liquid metal current collector surface on the inner periphery of said stationary annular plate cooperating with the rotary liquid metal current collector surface on said drum, and means for providing a magnetic field substantially axially through said rotatable annular plate and said stationary annular plate.

2. The machine of claim 1 having an electrically insulating coating on the axial end surface of said rotor adjacent said other end of said drum.

3. The machine of claim 2 having an electrically insulating coating on all surfaces of said stator that face corresponding surfaces of said rotor except for said rotor end surface and said liquid metal current collector surfaces.

4. The machine of claim 3 wherein the material of said electrically insulating coatings is aluminum oxide.

5. The machine of claim 1 wherein said highly conductive material is copper alloy and said ferromagnetic material is low carbon steel.

6. A dynamoelectric machine rotor comprising:
   (a) a cylindrical drum of highly conductive and nonmagnetic material;
   (b) a liquid metal current collector surface on the peripheral surface of said drum at one axial end thereof;
   (c) a radially extending annular plate of ferromagnetic material having the inner peripheral surface thereof attached to the outer peripheral surface of said drum at the other axial end of said drum;
   (d) a ring of highly conductive and nonmagnetic material having the inner peripheral surface thereof attached to the outer peripheral surface of said drum, said highly conductive and nonmagnetic material of said rotatable cylindrical drum and ring different from said ferromagnetic material of said annular plate; and
   (e) a liquid metal current collector surface in the outer peripheral surface of said ring.

7. The rotor of claim 6 having a coating of electrically insulating material on the axial end surface including said plate.

8. The rotor of claim 6 including a rotor shaft, said drum being mounted on said shaft for rotation therewith and said drum being electrically insulated from said shaft.

9. The rotor of claim 6 wherein said ferromagnetic material is low carbon steel and said highly conductive material is chromium alloy copper.

References Cited

UNITED STATES PATENTS

| | | | |
|---|---|---|---|
| 3,191,082 | 6/1965 | Csillag | 310—219 |
| 2,979,630 | 3/1961 | Bishop | 310—178 XR |
| 1,987,479 | 1/1935 | Japolski | 310—178 XR |
| 1,635,319 | 7/1927 | Gill et al. | 310—178 |
| 1,184,224 | 5/1916 | Breslaver. | |

OTHER REFERENCES

Steinmetz, Theory & Calculation of Electrical Apparatus, pp. 450–458.

MILTON O. HIRSHFIELD, *Primary Examiner.*

M. O. BUDD, *Assistant Examiner.*

U.S. Cl. X.R.

310—219, 236